United States Patent
Neu et al.

(10) Patent No.: US 11,465,602 B2
(45) Date of Patent: Oct. 11, 2022

(54) METHOD FOR CHECKING THE FUNCTIONALITY OF A BRAKING SYSTEM, AND BRAKING SYSTEM

(71) Applicant: Continental Teves AG & Co. oHG, Frankfurt am Main (DE)

(72) Inventors: Andreas Neu, Frankfurt am Main (DE); Boris Holzherr, Frankfurt am Main (DE); Thomas Buch, Frankfurt am Main (DE); Martin Brenn, Frankfurt am Main (DE); Andreas Baltes, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 187 days.

(21) Appl. No.: 16/763,767

(22) PCT Filed: Nov. 7, 2018

(86) PCT No.: PCT/EP2018/080457
§ 371 (c)(1),
(2) Date: May 13, 2020

(87) PCT Pub. No.: WO2019/096651
PCT Pub. Date: May 23, 2019

(65) Prior Publication Data
US 2020/0361439 A1 Nov. 19, 2020

(30) Foreign Application Priority Data

Nov. 15, 2017 (DE) ..................... 10 2017 220 308.0

(51) Int. Cl.
*B60T 17/22* (2006.01)
*B60T 13/58* (2006.01)
(Continued)

(52) U.S. Cl.
CPC ............ *B60T 17/221* (2013.01); *B60T 13/58* (2013.01); *B60T 13/686* (2013.01); *B60T 7/042* (2013.01);
(Continued)

(58) Field of Classification Search
CPC ...... B60T 17/221; B60T 13/686; B60T 13/58; B60T 7/042; B60T 2270/406;
(Continued)

(56) References Cited

U.S. PATENT DOCUMENTS 6,203,123 B1 * 3/2001 Oyama ..................... B60T 8/00
374/100
6,655,753 B1 * 12/2003 Fuhrer ..................... B60T 8/94
303/170

(Continued)

FOREIGN PATENT DOCUMENTS

| CN | 103118914 A | 5/2013 |
| CN | 105050872 A | 11/2015 |

(Continued)

OTHER PUBLICATIONS

German Search Report for German Application No. 10 2017 220 308.0, with partial English translation, dated Oct. 31, 2018, 8 pages.

(Continued)

*Primary Examiner* — Pamela Rodriguez
(74) *Attorney, Agent, or Firm* — RatnerPrestia

(57) ABSTRACT

A method for checking functionality of a motor vehicle braking system. The braking system has a main module, including: hydraulically actuatable wheel brakes, pairs being assigned to respective brake circuits; at least one electrically actuatable wheel valve per wheel brake sets wheel-specific brake pressures; a pressure provision device actively builds up pressure in the wheel brakes; a pressure-medium reservoir at atmospheric pressure, and an auxiliary module, which has for each of two wheel brakes: a pressure sensor (Continued)

for measuring pressure in a wheel brake line; an open when deenergized isolating valve in the wheel brake line; a pump. At least one variable is measured to assess functionality of the braking system. Using least one acceptance criterion, and checked whether the variable satisfies the acceptance criterion. Determining at least one variable representing the viscosity of the brake fluid, and the at least one acceptance criterion depends on a variable representing viscosity.

16 Claims, 3 Drawing Sheets

(51) Int. Cl.
*B60T 13/68* (2006.01)
*B60T 7/04* (2006.01)
*B60T 8/40* (2006.01)
*B60T 13/14* (2006.01)
*B60T 13/16* (2006.01)

(52) U.S. Cl.
CPC ......... *B60T 8/4081* (2013.01); *B60T 13/145* (2013.01); *B60T 13/165* (2013.01); *B60T 2270/402* (2013.01); *B60T 2270/404* (2013.01); *B60T 2270/406* (2013.01); *B60T 2270/82* (2013.01); *B60T 2270/88* (2013.01)

(58) Field of Classification Search
CPC ......... B60T 2270/088; B60T 2270/402; B60T 8/4081; B60T 13/145; B60T 13/165; B60T 2270/82; B60T 2270/404
See application file for complete search history.

(56) References Cited

U.S. PATENT DOCUMENTS

| | | |
|---|---|---|
| 6,901,789 B1 | 6/2005 | Fennel et al. |
| 9,415,758 B2 | 8/2016 | Drumm et al. |
| 9,718,451 B2 | 8/2017 | Kunz et al. |
| 9,873,416 B2 | 1/2018 | Roll et al. |
| 10,131,340 B2 | 11/2018 | Foitzik et al. |
| 2013/0140879 A1 | 6/2013 | Kneip |
| 2014/0110997 A1* | 4/2014 | Biller .................. B60T 13/745 303/9.62 |
| 2014/0203626 A1* | 7/2014 | Biller .................. B60T 13/58 303/14 |
| 2016/0052501 A1 | 2/2016 | Darscht et al. |
| 2017/0129468 A1* | 5/2017 | Besier .................. B60T 8/4086 |
| 2019/0016321 A1 | 1/2019 | Dinkel |

FOREIGN PATENT DOCUMENTS

| | | |
|---|---|---|
| DE | 10012041 A1 * | 12/2000 |
| DE | 102009028542 A1 | 2/2011 |
| DE | 102011078890 A1 | 1/2013 |
| DE | 102013204778 A1 | 9/2013 |
| DE | 102014216843 A1 | 2/2016 |
| WO | 2017144201 A1 | 8/2017 |

OTHER PUBLICATIONS

International Search Report and Written Opinion for International Application PCT/EP2018/080457, dated Mar. 21, 2019, 10 pages.
International Search Report and Written Opinion for International Application PCT/EP2018/080457, dated Mar. 21, 2019, 15 pages. (German).
Korean Notification of Reason for Refusal for Korean Application No. 10-2020-7013759, dated Aug. 19, 2021, with translation, 15 pages.
Chinese Office Action for Chinese Application No. 201880073851.5, dated Dec. 8, 2021, with translation, 14 pages.
European Intent to Grant a Patent for European Application No. 18 811 445.8, dated Jun. 8, 2022, with translation, 38 pages.

* cited by examiner

METHOD FOR CHECKING THE FUNCTIONALITY OF A BRAKING SYSTEM, AND BRAKING SYSTEM

CROSS REFERENCE TO RELATED APPLICATIONS

This application is the U.S. National Phase Application of PCT International Application No. PCT/EP2018/080457, filed Nov. 7, 2018, which claims priority to German Patent Application No. 10 2017 220 308.0, filed Nov. 15, 2017, the contents of such applications being incorporated by reference herein.

FIELD OF THE INVENTION

The invention relates to a method for checking the functionality of a braking system for motor vehicles, which braking system comprises a main module, comprising:
- hydraulically actuatable wheel brakes, wherein pairs of said wheel brakes are assigned to respective brake circuits;
- at least one electrically actuatable wheel valve per wheel brake, for setting wheel-specific brake pressures;
- a pressure provision device for actively building up pressure in the wheel brakes;
- a pressure-medium reservoir at atmospheric pressure, and furthermore comprising an auxiliary module, which comprises for each of two wheel brakes:
- a pressure sensor for measuring the pressure in a wheel brake line leading to the wheel brake;
- an isolating valve, which is arranged in the wheel brake line and which is open when deenergized;
- a pump (200).

It furthermore relates to an associated braking system.

BACKGROUND OF THE INVENTION

In motor vehicle engineering, "brake-by-wire" braking installations are being used ever more widely. Braking installations of this kind often have not only a brake master cylinder that can be actuated by the vehicle driver but also an electrically activatable pressure provision device (activatable "by-wire"), by means of which actuation of the wheel brakes takes place in the "brake-by-wire" operating mode.

In these braking systems, in particular electrohydraulic braking systems with the "brake-by-wire" operating mode, the driver is decoupled from direct access to the brakes. When the pedal is actuated, a pedal decoupling unit and a simulator are usually actuated, wherein the braking demand of the driver is detected by a sensor system. The pedal simulator, which is commonly formed as a brake master cylinder, is used to give the driver a brake pedal feel which is as familiar and comfortable as possible. The detected braking demand leads to the determination of a setpoint braking torque, from which the setpoint brake pressure for the brakes is then determined. The brake pressure is then built up actively in the brakes by a pressure provision device.

The actual braking is thus achieved by active pressure build-up in the brake circuits with the aid of a pressure provision device, which is activated by an open-loop and closed-loop control unit. By virtue of the brake pedal actuation being hydraulically decoupled from the pressure build-up, a large number of functionalities, such as ABS, ESC, TCS, slope launch assistance etc., can be implemented in a convenient manner for the driver in braking systems of this kind.

The pressure provision device in the braking systems described above is also referred to as an actuator or hydraulic actuator. In particular, actuators are designed as linear actuators or linear units, in which, for the pressure build-up, a piston is displaced axially into a hydraulic pressure space which is constructed in series with a rotation-translation mechanism. The motor shaft of an electric motor is converted by the rotation-translation mechanism into an axial displacement of the piston.

DE 10 2013 204 778 A1, incorporated herein by reference, has disclosed a "brake-by-wire" braking installation for motor vehicles which comprises a tandem brake master cylinder, which can be actuated by means of a brake pedal and the pressure spaces of which are in each case connected, separably by means of an electrically actuatable isolating valve, to a brake circuit with two wheel brakes, an activatable and deactivatable simulation device, which is hydraulically connected to the brake master cylinder, and an electrically controllable pressure provision device, which is formed by a cylinder-piston arrangement with a hydraulic pressure space, the piston of which is displaceable by an electromechanical actuator, wherein the pressure provision device is connected via two electrically actuatable activation valves to the inlet valves of the wheel brakes.

For better pressure control, there is a pressure sensor available in the region between the actuator and the actuator activation valves. This sensor detects the hydraulic pressure produced by the linear actuator (system pressure). The position of the linear actuator is usually detected by a motor angle sensor.

There are furthermore known braking systems in which brake pressure can be built up in at least one brake circuit with the aid of a pump in order to assist the driver. These braking systems are vacuum-less braking systems, which provide brake boosting hydraulically.

To enhance safety, both braking systems can be fitted with an auxiliary module, which can still carry out active braking at two brakes, even if the main braking system or main module fails. For this purpose, the auxiliary module comprises at least one pump for active pressure build-up. It furthermore has an isolating valve and an outlet valve for each brake for wheel-specific wheel brake pressure control.

An auxiliary module of this kind can also be provided, in particular, in highly automated vehicles, in which the vehicle performs braking processes in a substantially fully automatic way and drives and performs braking processes without intervention by the driver. If the main module fails, the vehicle can still be brought to a halt by the auxiliary module.

Before operation, a braking system is checked for correct functionality. Particularly in the case of highly automated driving (HAD), it is of crucial importance to ensure that, in a braking system of redundant design, the primary braking module and the auxiliary module are simultaneously functional. For this purpose, test routines are employed and it is checked whether an expected result representing correct functioning occurs. Two tests usually have to be carried out for the redundant system with a primary module and an auxiliary module.

On the one hand, the system checks in a purging cycle or purging process whether the pressure provision device can displace brake fluid into the expansion tank in the case of valve switching that allows this in principle, or whether certain hydraulic lines are not blocked. This ensures that the lines are not blocked or clogged. Moreover, any air that is present in the braking system is displaced in the direction of the reservoir. In the purging cycle, both sides (front right and front left) or both hydraulic circuits are tested sequentially, enabling each side to be unambiguously associated with a pressure.

In a pressure build-up cycle or pressure build-up process, the system checks whether, given suitable activation of the valves and of the motor pump, a minimum pressure can be built up as required by the auxiliary module or secondary system within a certain time.

The influence of the viscosity of the brake fluid on the respective result is very great. Here, the viscosity depends not only on the type and brand of brake fluid but also changes greatly at temperatures below −10° C., especially also with an unwanted increasing water content. In order to be sure that the braking system is ready for operation, the acceptance criteria must be set in such a way that functional braking systems are often identified as faulty. If a characteristic for viscosity against temperature is used, the factors of water content, type of brake fluid and aging of the brake fluid remain unaccounted for. In the case of automated driving processes, the system cannot access robust information on the viscosity. This results in an increased risk in the low temperature range of infringing the safety goal of "not underbraking".

A device and a method for determining at least one variable relating to a state of a brake fluid in a braking system of a vehicle are known from DE 10 2014 216 843 A1, incorporated herein by reference.

SUMMARY OF THE INVENTION

It is the underlying aspect of the invention is a method for checking the functionality of a braking system in which the reliability of the test results is optimized. A further aspect is a corresponding braking system.

In respect of the method, this is achieved according to an aspect of the invention in that at least one variable is measured in order to assess functionality, wherein at least one acceptance criterion is used, and wherein it is checked whether the variable satisfies said acceptance criterion, and wherein at least one variable representing the viscosity of the brake fluid is determined or measured, and wherein the at least one acceptance criterion depends on a variable representing the viscosity.

An aspect of the invention starts from the consideration that previous methods took too little account of the actually present physical conditions in the braking system, with the result that acceptance criteria that have to be satisfied if the braking system is to be assessed as functional are chosen in a generalized and conservative manner. As a result, non-functioning is incorrectly identified in situations in which the braking system is still functional.

As has now been recognized, these acceptance criteria can be improved if the viscosity of the brake fluid is measured as a significant influence on the behavior of the braking system during purging and pressure build-up processes and is taken into account for the acceptance criteria.

In a preferred embodiment, a purging process is carried out, in which the pressure provision device displaces brake fluid into the pressure-medium reservoir, wherein a first system pressure is measured, and wherein a second system pressure is measured, and an acceptance criterion counts as satisfied if the first system pressure is lower than an acceptance pressure, which depends on the pressure difference between the first and second system pressures. During the purging process or pressure build-up process, the pressure provision device of the main module is activated in each case.

The viscosity of the brake fluid is thus taken into account inasmuch as the first and/or second system pressure and hence also the difference between them depends on the viscosity.

The acceptance pressure is preferably formed from the sum of a first constant and a product of the pressure difference between the first and the second system pressure and a second constant.

The first constant preferably has a value which is greater than zero bar. The second constant is preferably a number with a value greater/greater than or equal to 1.

In a preferred embodiment of the method, the first system pressure is measured in a hydraulic line in the main module, and wherein the second system pressure is measured in a hydraulic line in the auxiliary module.

A pressure sensor, by means of which the second system pressure is measured, is arranged in a first brake circuit in the auxiliary module, wherein the value of the system pressure measured in the first brake circuit is also used in the purging process for the second brake circuit.

In a preferred embodiment of the method, a pressure build-up process is carried out with the aid of the pressure provision device, wherein a brake fluid is delivered into at least one wheel brake by the pressure provision device for a predetermined time period, and wherein a system pressure that is present after the predetermined time period is measured, and wherein an acceptance criterion counts as satisfied if the measured pressure is greater than an expected pressure, which depends on the time period and an expected delivery rate of the pressure provision device.

An expected delivery volume is advantageously calculated from the product of a delivery rate, which is dependent on the viscosity and/or temperature, and the predetermined time period, wherein the expected pressure is calculated from the expected delivery volume with the aid of a predetermined pressure-volume characteristic.

The expected delivery volume is preferably corrected by a release clearance volume. For this purpose, the release clearance volume is advantageously subtracted from the delivery volume.

The temperature of the brake fluid is preferably measured by means of at least one temperature sensor.

The temperature is preferably measured with the aid of a multiplicity of temperature sensors, from the measured values of which a mean value is then formed.

The viscosity of the brake fluid is preferably determined from the temperature by means of a characteristic.

It is advantageous if at least one pressure sensor is arranged in the main module and at least one pressure sensor is arranged in the auxiliary module.

It is advantageous if the respective temperature sensor is formed by means of a respective pressure sensor of integrated design. In this way, it is possible to save installation space, and the number of components required can be reduced.

In respect of the braking system, this is achieved according to an aspect of the invention with an open-loop and closed-loop control unit in which a method described above is implemented in hardware and/or software.

The pressure provision device is preferably designed as a linear actuator.

The advantages of an aspect of the invention consist, in particular, in the fact that the influence of the viscosity on the identification of the state of the braking system can be taken into account. The acceptance criteria can be chosen in such a way that the probability of identifying an intact braking system as faulty is lowered to an acceptable level. This results in enhanced robustness in the assessment of the braking system in respect of its correct functioning. Moreover, a servicing recommendation for a change of brake fluid can be given if the viscosity is outside acceptable limits.

Through the use of the sensors available in the braking system, there are no additional costs. The reliability and robustness of the test results are enhanced by the use of a plurality of sensors and redundant measurements.

BRIEF DESCRIPTION OF THE DRAWINGS

An exemplary embodiment of the invention will be discussed in more detail on the basis of a drawing. In the drawing, in a highly schematic illustration.

In all of the figures, identical parts are denoted by the same reference designations.

DETAILED DESCRIPTION OF THE PREFERRED EMBODIMENTS

Figure 1:
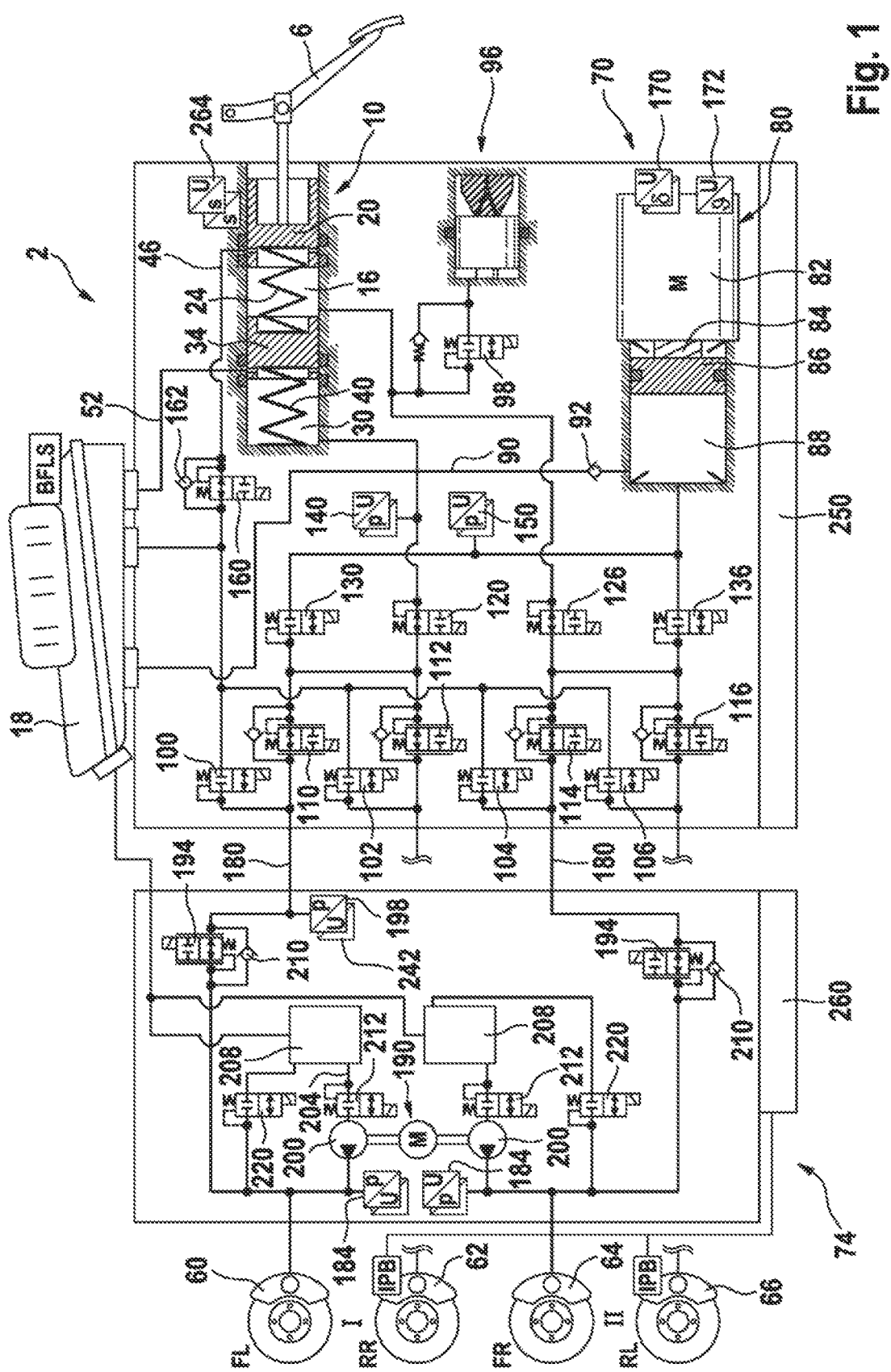
FIG. 1 shows a braking system having a main module and an auxiliary module in a preferred embodiment.

A braking system 2 illustrated in FIG. 1 comprises a brake pedal 6, by means of which a tandem brake master cylinder 10 is actuated. The tandem brake master cylinder 10 has a first pressure chamber or primary pressure chamber 16, into which a primary pressure piston 20 that is acted upon by a first elastic element 24 can be displaced. The tandem brake master cylinder 10 has a second pressure chamber or secondary chamber 30, into which a secondary piston 34, in particular a floating secondary piston, that is acted upon by a second elastic element 40 can be displaced. In the unactuated state of the primary pressure piston 20, the primary pressure chamber 16 is connected via a hydraulic line 46 to a pressure-medium reservoir 18. In the unactuated state of the secondary pressure piston 34, the secondary pressure chamber 16 is connected via a hydraulic line 52 to the pressure-medium reservoir 18.

The braking installation or braking system 2 comprises four hydraulically actuatable wheel brakes 60, 62, 64, 66. The braking system 2 has a main module 70, which is used for pressure control during the normal operation of the braking installation, and an auxiliary module 74, which is used if the main module 70 malfunctions or fails.

The braking system 2 also has the following further components in the main module 70. A pressure provision device 80 is designed as a linear actuator, having an electric motor 82, a downstream rotation-translation mechanism 84, which converts the rotation of the motor shaft into a translation of a pressure piston 86 delimiting a pressure space 88. The pressure space 88 is connected to the pressure-medium reservoir 18 via a replenishment line 90, into which a check valve 92 is inserted. The rotation-translation mechanism 84 is preferably designed as a ball screw.

The primary pressure chamber 16 is connected hydraulically to a simulator 96, wherein the connection between the primary pressure chamber 16 and the simulator 16 can be divided by a simulator valve 98. Each of the wheel brakes 60-66 is assigned an outlet valve 100, 102, 104, 106, which is preferably closed when deenergized, and an inlet valve 110, 112, 114, 116, which is preferably open when deenergized. A respective check valve is connected in parallel with the respective inlet valve 110-116.

The wheel brakes 60, 62 are assigned to a first brake circuit I and are connected hydraulically in a separable manner to the secondary chamber 30 by an isolating valve 120. The wheel brakes 64, 66 are assigned to a second brake circuit II and are connected hydraulically in a separable manner to the primary chamber 16 by an isolating valve 126.

The pressure provision device 80 can be connected hydraulically to wheel brakes 60, 62 by an activation valve 130 and can be connected hydraulically to wheel brakes 64, 66 by an activation valve 136.

A pressure sensor 140, preferably of redundant design, measures the pressure in the secondary chamber 30. A pressure sensor 150, preferably of redundant design, measures the pressure in the pressure chamber 88, which is referred to as system pressure.

When valve 160 is switched and valve 136 is switched, a further self test can be carried out to check the capacity of the pressure provision device to provide pressure. Valve 162 prevents a vacuum in the actuating unit if, for example, the pressure provision device moves back into the rear end position as part of this self test. The motor position or rotation angle is measured with the aid of a sensor 170. A further sensor 172 is preferably provided for measuring the motor winding temperature. The wheel brakes are split diagonally, wherein brakes 60 and 64 are the front wheel brakes.

An auxiliary module 74 of the braking system 2 is designed, when required, particularly when there is a fault or a total failure of the main module 70, to set a wheel-specific brake pressure in wheel brakes 60, 64 in a first operating mode, when required. Wheel brakes 62, 66 are directly connected hydraulically to pressure provision device 80 or brake master cylinder 10, and no wheel brake pressure is set in these brakes by the auxiliary module 74. In another operating mode, the auxiliary module 74 of the braking system 2 is designed to set a brake pressure at all the wheels 60 to 66 if, should there be a partial failure of the main module 70, the valves 100-162 thereof are still available for operation.

When viewed from wheel brake 60, a pressure sensor 184, a pump 190 with a first feed pump 200, an isolating valve 194 which is open when deenergized and with which a check valve 210 is connected in parallel, and a pressure sensor 198 are arranged in a hydraulic line 180, by means of which wheel brake 60 can be connected to the brake master cylinder 10 or the pressure provision device 80 when required. On the suction side, the pump 200 is connected via a hydraulic suction line 204 to a volume reservoir 208 for pressure medium, which is connected to the pressure-medium reservoir 18 via a line. A changeover valve 212, which is used to throttle the pump and which is closed when deenergized, is inserted into the suction line 204. The volume reservoir 208 is furthermore connected to wheel brake 60 via an activation valve 220, which is preferably closed when deenergized.

The auxiliary module 74 is designed in the same way in respect of wheel brake 64, and the corresponding components are provided with the same reference signs. Here, however, in contrast to the wheel brake 60, no pressure sensor 198 that measures the pressure in the line 180 is provided. In an alternative embodiment, a further pressure sensor 198 can be provided in this case too. In the preferred embodiment, at least one pressure sensor is formed in combination with a temperature sensor 242 (shown by way of example in the case of pressure sensor 198). It is thereby possible also to measure the temperature of the brake fluid at those points at which the pressure is measured. All the pressure sensors are preferably combined with temperature sensors, or both sensors are formed in an integrated design.

A first electronic open-loop and closed-loop control unit 250 in the main module is used to detect the braking demand, in particular with the aid of a travel sensor 264 and the activation of the pressure provision device 80 and of the valves 100-106, 110-16, 120, 126, 130, 136.

A second electronic open-loop and closed-loop control unit 260 in the auxiliary module 74 is used to control the pump 200 and the valves 194, 220, 212. As an input signal, the electronic open-loop and closed-loop control unit 260 receives the driver braking demand detected by the sensor 264. There is a signal link between the two open-loop and closed-loop control units 250, 260 at least in one direction.

Figure 2:
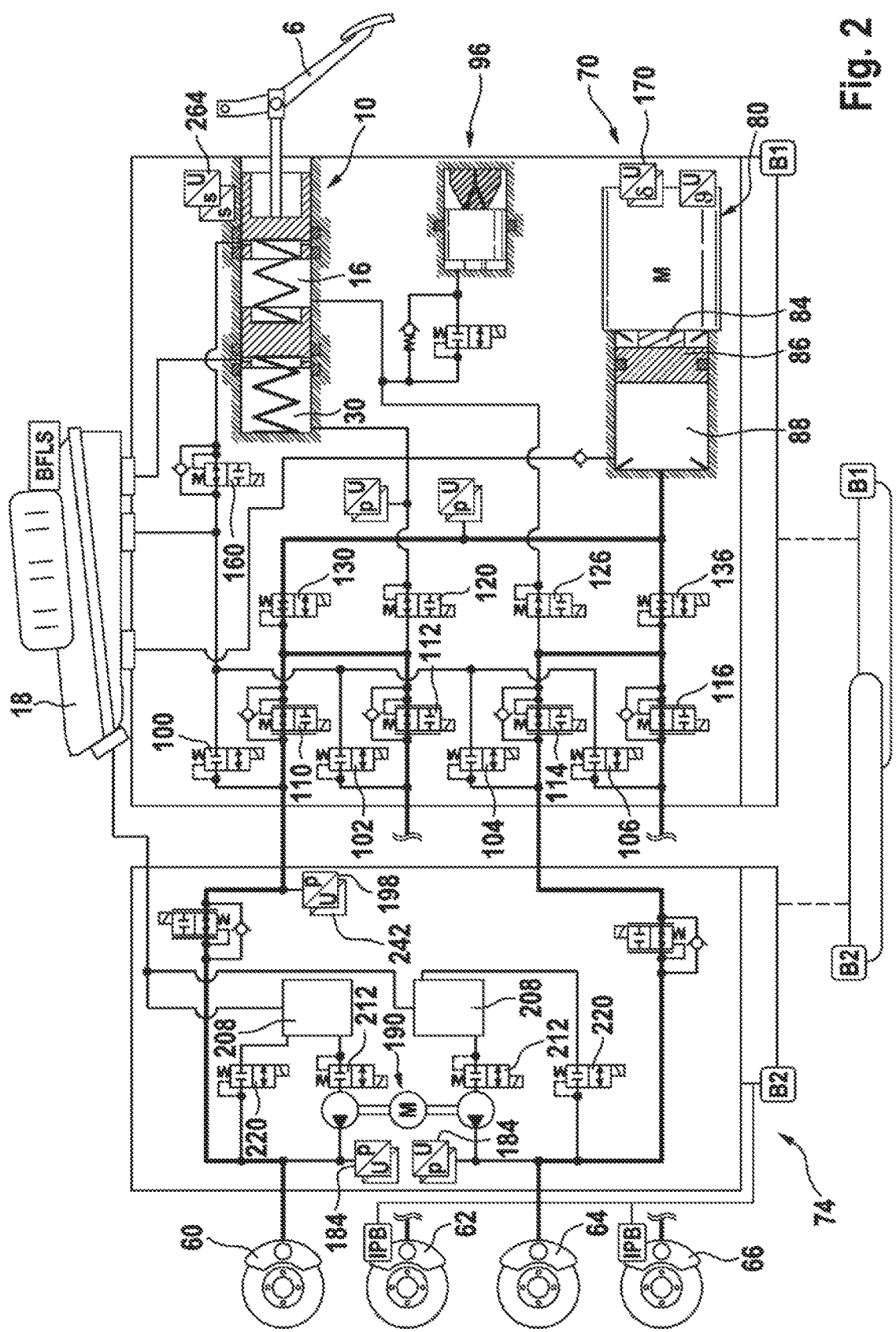
FIG. 2 shows the braking system according to FIG. 1 in a first state.

The braking system 2 is illustrated in an operating position corresponding to a normal braking process in FIG. 2. The driver is actuating the brake pedal 6 and displacing pressure medium from the primary chamber in the direction of the simulator 96. The two chambers 16, 30 of the brake master cylinder 10 are separated hydraulically from the wheel brakes 60-66 by the closed isolating valves 120, 126. The activation valves 130, 136 are open, and therefore pressure can be built up actively in the wheel brakes by the pressure provision device 80. For this purpose, the inlet valves 110-116 are open and the outlet valves 100-106 are closed. For wheel-specific pressure build-up, pressure can be built up selectively in a wheel brake 60-66 by opening the respective outlet valve 100-106. The valves 194 in the auxiliary module 74 are open. To enable the pressure medium flow to take place in this way, valves 120, 126 must be closed and valves 130, 136 must be open, unlike the situation illustrated in FIG. 2.

Figure 3:
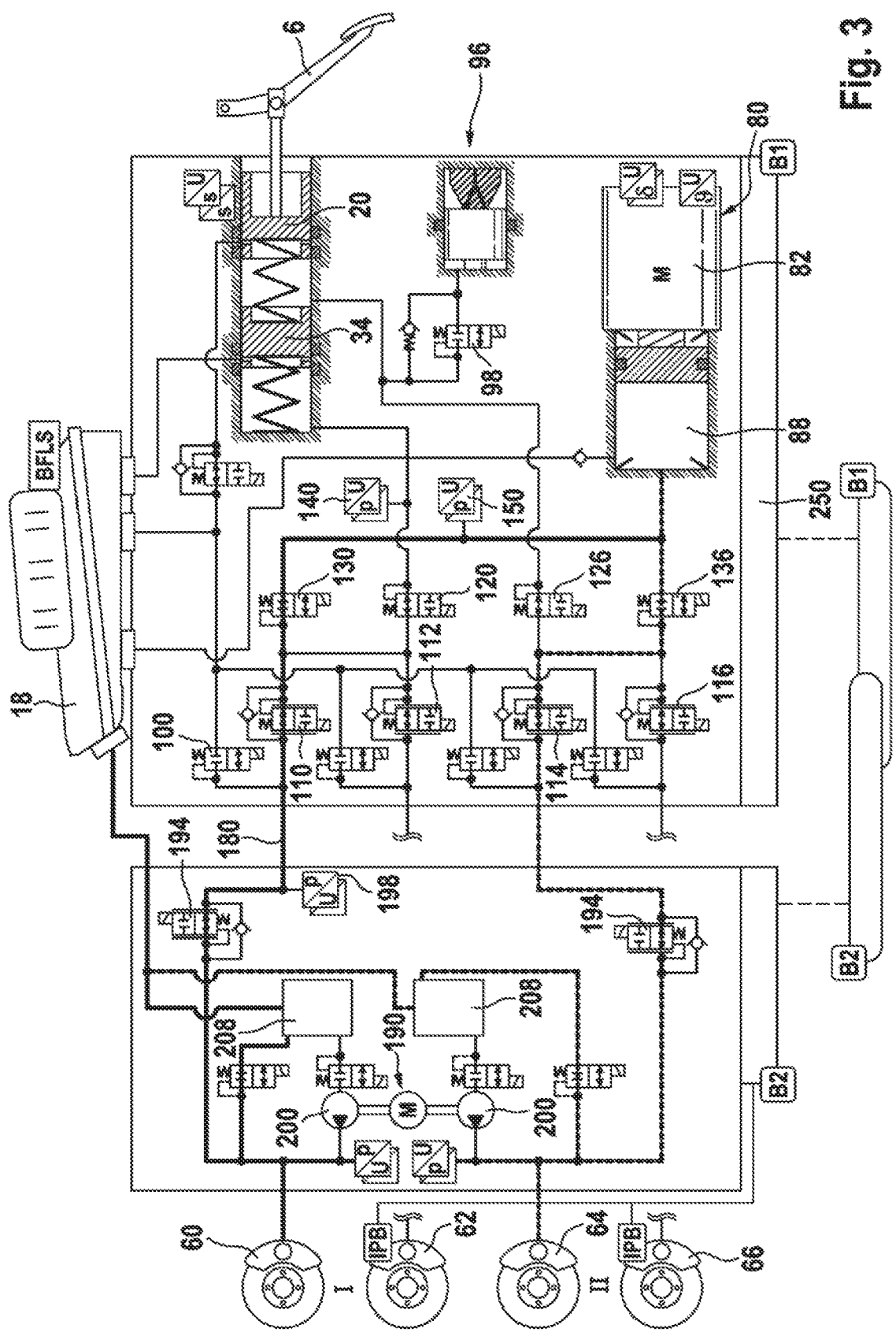
FIG. 3 shows the braking system according to FIG. 1 in a second state.

In FIG. 3, the braking system 2 is illustrated during a two-phase purging cycle or purging process, in which the system checks whether the braking system 2 can discharge pressure medium into the pressure-medium reservoir 18. For this purpose, a check is made in a first phase as to whether pressure medium can be discharged in brake circuit I. For this purpose, activation valve 130 is opened, while activation valve 136 and isolating valves 120, 126 are closed. Only the inlet valve 110 assigned to wheel brake 60 is opened, while inlet valves 112, 114, 116 are closed. Outlet valve 100 is closed and valve 194 is opened. The pressure accumulator 208 is connected hydraulically to wheel brake 60. With the aid of the linear actuator or pressure provision device 80, brake fluid is now displaced into brake circuit I, and therefore, owing to the switching of the valves, brake fluid is displaced into the pressure-medium reservoir 18.

Pressure sensor 150 measures a first system pressure $P_{sys,1}$, which corresponds substantially to the pressure prevailing in the pressure space 88. Pressure sensor 198 measures a second system pressure $P_{sys,2}$ in the line 180 in the auxiliary module 74. At the volume flow determined by the linear actuator, system pressures $P_{sys,1}$ and $P_{sys,2}$ will now be established, especially if the brake fluid is highly viscous. It is preferably the mean values of the system pressures $P_{sys,1}$ and $P_{sys,2}$ over the time period in which the predetermined volume flow is set which are evaluated.

In the case of a clogged line between the auxiliary module 74 and the pressure-medium reservoir 18 or reservoir, the two pressures $P_{sys,1}$ and $P_{sys,2}$ will have almost the same (relatively high) value. If this is not the case, i.e. the hydraulic connection to the reservoir is open, a pressure gradient from $P_{sys,1}$ to $P_{sys,2}$ is established. An acceptance criterion is therefore preferably formulated $$P_{sys,1} < (P_{akzept} = c + r*(P_{sys,1} - P_{sys,2})).$$

Here, r is a numerical constant derived from the relationship between the line resistances. $R_1$ determined by the line and the valves on the way from $P_{sys,1}$ to $P_{sys,2}$ and $R_2$ determined by the line and the valve on the way from $P_{sys,2}$ to the reservoir 18. The following applies: $r = (R_1 + R_2)/R_2$ $r > 1$ and c is a constant with a unit of pressure, where $c > 0$.

After this purging process, the system checks whether it is also possible in the second brake circuit II to displace pressure medium into the reservoir. For this purpose, activation valve 136 is opened, while activation valve 130 and isolating valves 120, 126 are closed. As described above, valve 194 is opened in the auxiliary module. The pressure accumulator 208 is connected hydraulically to wheel brake 64. Since there is no pressure sensor in brake circuit II, the value measured there for the purging process in brake circuit II is used for the application of the above-described acceptance criterion.

The invention claimed is:

1. A method for checking the functionality of a braking system for motor vehicles, which braking system comprises a main module, comprising:
   hydraulically actuatable wheel brakes, wherein pairs of said wheel brakes are assigned to respective brake circuits;
   at least one electrically actuatable wheel valve per wheel brake for setting wheel-specific brake pressures;
   a pressure provision device for actively building up pressure in the wheel brakes;
   a pressure-medium reservoir at atmospheric pressure, and furthermore comprising an auxiliary module, which comprises for each of two wheel brakes:
   a pressure sensor for measuring the pressure in a wheel brake line leading to the respective wheel brake;
   an isolating valve, which is arranged in the respective wheel brake line and which is open when deenergized; and
   a pump, the method comprising:
   measuring at least one variable in order to assess the functionality of the braking system, wherein at least one acceptance criterion is used,
   checking whether the variable satisfies said acceptance criterion, and
   determining at least one variable representing viscosity of brake fluid,
   wherein the at least one acceptance criterion depends on the variable representing the viscosity.

2. The method as claimed in claim 1, wherein a temperature of the brake fluid is measured by at least one temperature sensor.

3. The method as claimed in claim 2, wherein the temperature is measured with the aid of a multiplicity of temperature sensors, from the measured at least one variable of which a mean value is then formed.

4. The method as claimed in claim 2, wherein at least one pressure sensor is arranged in the main module and at least one pressure sensor is arranged in the auxiliary module.

5. The method as claimed in claim 4, wherein the at least one temperature sensor is formed by a respective pressure sensor of integrated design.

6. The method as claimed in claim 1, wherein the viscosity of the brake fluid is determined from a temperature by a characteristic.

7. A braking system for motor vehicles, comprising a main module, comprising:
- hydraulically actuatable wheel brakes, wherein pairs of said wheel brakes are assigned to respective brake circuits;
- at least one electrically actuatable wheel valve per wheel brake for setting wheel-specific brake pressures;
- a pressure provision device for actively building up pressure in the wheel brakes;
- a pressure-medium reservoir at atmospheric pressure, and
- furthermore comprising an auxiliary module, which comprises for each of two wheel brakes:
- a pressure sensor for measuring the pressure in a wheel brake line leading to the wheel brake;
- an isolating valve, which is arranged in the wheel brake line and which is open when deenergized; and
- a pump,
- having an open-loop and closed-loop control unit, in which a method as claimed in claim 1 is implemented in hardware and/or software.

8. The braking system as claimed in claim 7, wherein the pressure provision device is a linear actuator.

9. A method for checking the functionality of a braking system for motor vehicles, which braking system comprises a main module, comprising:
- hydraulically actuatable wheel brakes, wherein pairs of said wheel brakes are assigned to respective brake circuits;
- at least one electrically actuatable wheel valve per wheel brake for setting wheel-specific brake pressures;
- a pressure provision device for actively building up pressure in the wheel brakes;
- a pressure-medium reservoir at atmospheric pressure, and
- furthermore comprising an auxiliary module, which comprises for each of two wheel brakes:
- a pressure sensor for measuring the pressure in a wheel brake line leading to the respective wheel brake;
- an isolating valve, which is arranged in the respective wheel brake line and which is open when deenergized; and
- a pump, the method comprising:
- measuring at least one variable in order to assess the functionality of the braking system, wherein at least one acceptance criterion is used,
- checking whether the variable satisfies said acceptance criterion, and
- determining at least one variable representing viscosity of the brake fluid,
- wherein the at least one acceptance criterion depends on the variable representing the viscosity; and
- carrying out a purging process, in which brake fluid is displaced into the pressure-medium reservoir by the pressure provision device, wherein a first system pressure is measured, and wherein a second system pressure is measured, and the acceptance criterion counts as satisfied if the first system pressure is lower than an acceptance pressure, which depends on the pressure difference between the first and second system pressures.

10. The method as claimed in claim 9, wherein the acceptance pressure is formed from the sum of a first constant and a product of the pressure difference between the first and the second system pressure and a second constant.

11. The method as claimed in claim 10, wherein the first system pressure is measured in a hydraulic line in the main module, and wherein the second system pressure is measured in a hydraulic line in the auxiliary module.

12. The method as claimed in claim 9, wherein the first system pressure is measured in a hydraulic line in the main module, and wherein the second system pressure is measured in a hydraulic line in the auxiliary module.

13. The method as claimed in claim 12, wherein a pressure sensor, by which the second system pressure is measured, is arranged in a first brake circuit in the auxiliary module, and wherein the value of the system pressure measured in the first brake circuit is also used in the purging process for the second brake circuit.

14. A method for checking the functionality of a braking system for motor vehicles, which braking system comprises a main module, comprising:
- hydraulically actuatable wheel brakes, wherein pairs of said wheel brakes are assigned to respective brake circuits;
- at least one electrically actuatable wheel valve per wheel brake for setting wheel-specific brake pressures;
- a pressure provision device for actively building up pressure in the wheel brakes;
- a pressure-medium reservoir at atmospheric pressure, and
- furthermore comprising an auxiliary module, which comprises for each of two wheel brakes:
- a pressure sensor for measuring the pressure in a wheel brake line leading to the respective wheel brake;
- an isolating valve, which is arranged in the respective wheel brake line and which is open when deenergized; and
- a pump, the method comprising:
- measuring at least one variable in order to assess the functionality of the braking system,
- wherein at least one acceptance criterion is used,
- checking whether the variable satisfies said acceptance criterion, and
- determining at least one variable representing viscosity of the brake fluid,
- wherein the at least one acceptance criterion depends on the variable representing the viscosity, and
- wherein a pressure build-up process is carried out with the aid of the pressure provision device, wherein the brake fluid is delivered into at least one wheel brake by the pressure provision device for a predetermined time period, and wherein a system pressure that is present after the predetermined time period is measured, and wherein the acceptance criterion counts as satisfied if the measured pressure is greater than an expected pressure, which depends on the time period and an expected delivery rate of the pressure provision device.

15. The method as claimed in claim 14, wherein an expected delivery volume is calculated from the product of a delivery rate, which is dependent on the viscosity and/or temperature, and the predetermined time period, and wherein the expected pressure is calculated from the expected delivery volume with the aid of a predetermined pressure-volume characteristic.

16. The method as claimed in claim 15, wherein the expected delivery volume is corrected by a release clearance volume.

* * * * *